June 10, 1924.

C. M. ANDERSEN

AUTOMOBILE BUMPER

Filed June 7, 1923

1,496,967

Inventor
C. M. Andersen.

By

Attorney

Patented June 10, 1924.

1,496,967

UNITED STATES PATENT OFFICE.

CHARLES MARIUS ANDERSEN, OF DENVER, COLORADO.

AUTOMOBILE BUMPER.

Application filed June 7, 1923. Serial No. 643,982.

*To all whom it may concern:*

Be it known that I, CHARLES MARIUS ANDERSEN, a citizen of the United States, residing in the city and county of Denver and State of Colorado, have invented certain new and useful Improvements in Automobile Bumpers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automobile bumpers.

Owing to the great numbers of automobiles on our roads and in our streets, and to the fact that the cities require parallel parking, it often happens that a car will be injured by being brought into violent contact with another as may readily occur in getting into and out of a parking space or in driving along the street where sudden stops must sometimes be made.

In order to protect the cars from injury, due to causes pointed out above, and to other and similar causes, it is customary to provide the cars with bumpers at the rear and in the front. These bumpers are usually flat, narrow bars that are more or less resiliently or yieldingly secured to the cars and which by reason of their position to the front of and to the rear of the car, will strike the obstruction and gradually bring the car to a stop. All makes of cars are, however, different to some extent and the bumpers are as a rule on different levels. It would be preferable if the bumpers were all on the same height from the ground so that they would engage with each other, but this is rarely the case. It is evident that, if the bumpers were made wide instead of narrow, they would engage even if the centerlines were at different heights from the ground, but very few, if any, bumpers are of sufficient width to compensate for the different heights at which they are placed from the ground.

It is the object of this invention to produce an attachment that can be readily applied to any existing bumper and which will increase its effective width to such an extent that it will engage with bumpers placed at various heights, thus increasing the effectiveness of the bumpers. It is also my intention to so design these attachments that they shall be ornamental and add to the appearance of the car.

In order to better and more clearly describe my invention, I shall have reference to the accompanying drawing in which my invention is shown in its preferred form, and in which.

The same reference characters will be employed to designate the same parts throughout the several views.

Figure 1:
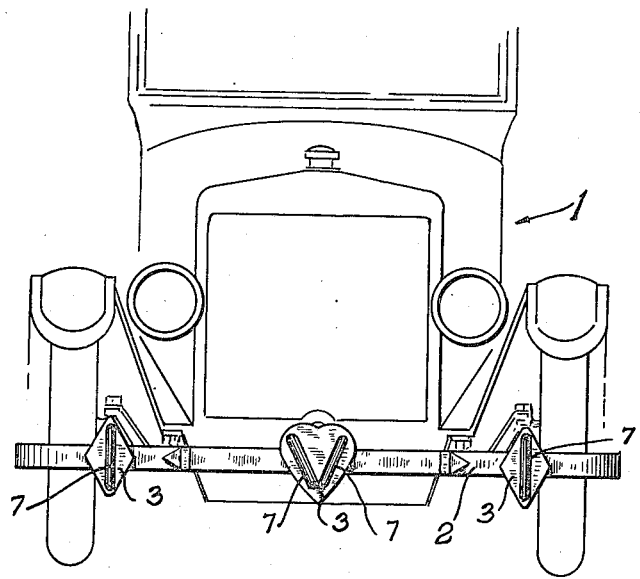
Fig. 1 shows a front elevation of an automobile equipped with a bumper to which my attachment is secured.
Figure 2:
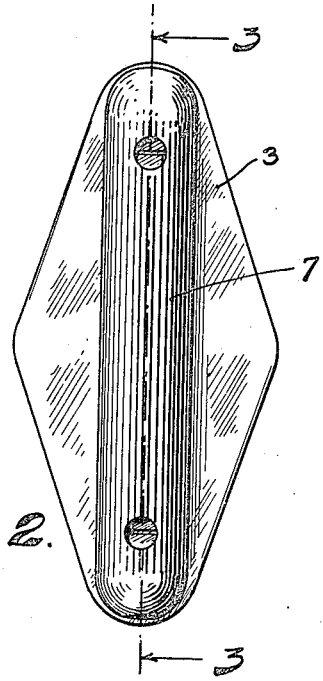
Fig. 2 is a front elevation of one of the attachments which form the subject of this invention.
Figure 3:
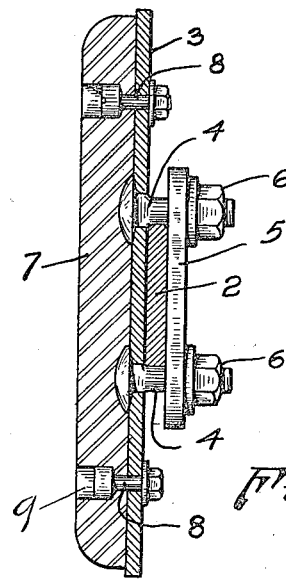
Fig. 3 is a section taken on line 3—3, Fig. 2.

Numeral 1 designates an automobile and 2 designates the bumper which is of ordinary construction, being formed of a resilient steel bar in the manner indicated in Fig. 1. My attachment consists of a plate 3 of steel, iron or other suitable material which may have any suitable shape such as a diamond or heart shape. The shape of the plate has nothing to do with the invention, but is determined by the ornamental effect that it produces. At present I plan to employ a diamond shaped plate at each end of the bumper and a heart shaped plate in the center. The plates 3 are eight (8) inches or more in length and have two symmetrically arranged openings for the reception of short carriage bolts 4 which are used to clamp the plates to the bumper. A plate 5 is provided for engagement with the rear surface of the bumper and with the nuts 6. Secured to the front side of each bumper plate is a resilient bar 7 of rubber, wood or other suitable material. These bars are held in place by means of bolts 8 whose heads occupy countersunk openings 9 in the manner indicated in Fig. 3. The plates 3 are preferably nickel-plated and highly polished, whereas the bars 7 are black, which makes a combination having a pleasing appearance. The bars 7 serve a useful function in this, that they prevent the plates from scratching the bumper with which it contacts and its resilient or yielding nature also prevents the production of metallic sounds when two bumpers contact, and they furthermore absorb some of the shock.

Where the plates are made heart-shape, as shown in Fig. 1, two bars 7 may be applied and two sets of clamping bolts.

It is evident that when a bumper is provided with my attachment, it will have an effective width of the length of the plates and that it will therefore engage with bumpers which are both higher and lower than the part 2 to which the plates are attached, and, besides, the useful function performed by the plates, they will greatly add to the ornamental appearance.

Having now described my invention, what I claim is:

An attachment for bumpers comprising a plate having two spaced symmetrically-arranged holes, a bolt in each of said holes, a clamping plate on said bolts, and a bar of resilient material secured to said plate said bar covering the bolt heads and holding the bolts in place.

In testimony whereof I affix my signature.

CHARLES MARIUS ANDERSEN.